(12) United States Patent
Marshall et al.

(10) Patent No.: US 7,299,565 B2
(45) Date of Patent: Nov. 27, 2007

(54) TAPE MEASURE

(75) Inventors: James D. Marshall, Ontario (CA); Oleksiy P. Sergyeyenko, Ontario (CA); Colin M. Dyke, Ontario (CA); Michael A. Milligan, Ontario (CA)

(73) Assignee: Black & Decker, Newark, DE (US)

( * ) Notice: Subject to any disclaimer, the term of this patent is extended or adjusted under 35 U.S.C. 154(b) by 0 days.

(21) Appl. No.: 11/356,465

(22) Filed: Feb. 17, 2006

(65) Prior Publication Data

US 2006/0248742 A1 Nov. 9, 2006

Related U.S. Application Data

(63) Continuation-in-part of application No. 10/755,435, filed on Jan. 12, 2004, now Pat. No. 7,024,791.

(51) Int. Cl.
*G01B 3/10* (2006.01)

(52) U.S. Cl. .......................................... 33/768; 33/42

(58) Field of Classification Search .................. 33/42, 33/755, 758, 759, 760, 761, 768, 769, 770
See application file for complete search history.

(56) References Cited

U.S. PATENT DOCUMENTS

| | | | |
|---|---|---|---|
| 2,563,674 A | 8/1951 | Coots | |
| 2,914,269 A | 11/1959 | Freeman | |
| 4,200,984 A | 5/1980 | Fink | |
| 4,227,314 A | 10/1980 | Schliep | |
| 4,429,462 A | 2/1984 | Rutty | |
| 4,479,617 A | 10/1984 | Edwards | |
| 4,516,325 A * | 5/1985 | Cohen et al. | 33/760 |
| 4,527,334 A | 7/1985 | Jones | |
| 4,578,867 A | 4/1986 | Czerwinski | |
| 4,580,347 A * | 4/1986 | McKnight | 33/760 |
| 4,908,954 A | 3/1990 | Johnson | |
| 4,930,227 A | 6/1990 | Ketchpel | |
| 4,944,097 A * | 7/1990 | Kang | 33/760 |
| 4,972,601 A | 11/1990 | Bickford | |
| 5,020,235 A * | 6/1991 | Martin | 33/768 |
| 5,063,686 A | 11/1991 | Peloquin | |
| 5,075,977 A | 12/1991 | Rando | |
| 5,113,596 A | 5/1992 | Meyers | |
| 5,182,863 A | 2/1993 | Rando | |
| 5,287,627 A | 2/1994 | Rando | |
| 5,390,426 A | 2/1995 | Hull | |
| 5,430,952 A | 7/1995 | Betts | |
| 5,481,810 A | 1/1996 | Hastings et al. | |

(Continued)

*Primary Examiner*—G. Bradley Bennett
(74) *Attorney, Agent, or Firm*—Edell, Shapiro & Finnan LLC

(57) ABSTRACT

A tape measure includes a housing, a rule blade coilable within the housing, and an edge guide coupled to the housing. The edge guide may be oriented in either a first position, in which the edge guide contacts the edge of a work surface, or a second position, in which the edge guide does not contact the edge of the work surface. The edge guide may be permanently or releasably connected to the housing. The tape measure may further include a laser assembly that generates a laser line intersecting the rule blade and the work surface and a calibration mechanism to adjust the alignment of the laser line. In use, the edge guide may orient the tape measure on the work surface such that the laser line is generally perpendicular to the work surface edge.

24 Claims, 10 Drawing Sheets

U.S. PATENT DOCUMENTS

| | | |
|---|---|---|
| 5,531,031 A | 7/1996 | Green |
| 5,544,420 A * | 8/1996 | Choi .......................... 33/760 |
| 5,588,216 A | 12/1996 | Rank et al. |
| 5,746,004 A | 5/1998 | Wertheim |
| 5,787,599 A | 8/1998 | Clifton |
| 5,791,581 A | 8/1998 | Loeffler et al. |
| 5,836,081 A | 11/1998 | Orosz, Jr. |
| 5,839,200 A | 11/1998 | Decesare |
| 5,842,282 A | 12/1998 | Ting |
| 5,848,481 A | 12/1998 | Parsons et al. |
| 5,864,956 A | 2/1999 | Dong |
| 5,894,675 A | 4/1999 | Cericola |
| 5,930,904 A | 8/1999 | Mualem |
| 5,983,510 A | 11/1999 | Wu et al. |
| 6,098,303 A | 8/2000 | Vogel |
| D433,344 S | 11/2000 | Hsu |
| 6,148,534 A | 11/2000 | Li |
| 6,158,139 A | 12/2000 | Bond |
| 6,163,969 A | 12/2000 | Jan et al. |
| 6,178,655 B1 * | 1/2001 | Potter et al. .................. 33/761 |
| 6,182,916 B1 | 2/2001 | Lin |
| 6,202,312 B1 | 3/2001 | Rando |
| 6,209,219 B1 | 3/2001 | Wakefield et al. |
| 6,223,446 B1 | 5/2001 | Potter |
| 6,226,886 B1 | 5/2001 | Lamond |
| 6,243,964 B1 | 6/2001 | Murray |
| 6,249,986 B1 | 6/2001 | Murray |
| 6,256,895 B1 | 7/2001 | Akers |
| 6,282,808 B1 | 9/2001 | Murray |
| 6,324,769 B1 | 12/2001 | Murray |
| 6,360,446 B1 | 3/2002 | Bijawat et al. |
| 6,367,161 B1 | 4/2002 | Murray |
| 6,382,547 B1 | 5/2002 | Yang |
| D462,912 S | 9/2002 | Li |
| 6,449,866 B1 | 9/2002 | Murray |
| D464,579 S | 10/2002 | Martone |
| 6,473,986 B1 | 11/2002 | Sun |
| 6,526,673 B1 | 3/2003 | Reed |
| 6,568,099 B2 | 5/2003 | Bergeron |
| 6,581,296 B2 * | 6/2003 | Ponce .......................... 33/760 |
| D476,913 S | 7/2003 | Blackman et al. |
| 6,598,310 B1 | 7/2003 | Odachowski |
| 6,643,947 B2 | 11/2003 | Murray |
| 6,662,463 B2 | 12/2003 | Lee |
| 6,694,622 B2 * | 2/2004 | Kim .......................... 33/770 |
| D494,073 S | 8/2004 | Al-Darraji |
| 6,804,899 B2 | 10/2004 | Murray |
| 6,807,747 B1 | 10/2004 | Hsu |
| 6,839,981 B2 | 1/2005 | Rafter |
| 6,854,197 B2 | 2/2005 | Knight |
| 6,860,031 B2 | 3/2005 | Odachowski |
| 6,874,245 B2 | 4/2005 | Liu |
| D504,628 S | 5/2005 | Weeks et al. |
| D504,835 S | 5/2005 | Snider |
| 6,907,676 B2 | 6/2005 | Liao |
| 6,959,500 B2 | 11/2005 | Liao |
| 7,024,791 B2 * | 4/2006 | Marshall et al. ............... 33/768 |
| 7,162,805 B2 * | 1/2007 | Vick .......................... 33/42 |
| 2002/0073568 A1 * | 6/2002 | Johnson ....................... 33/668 |
| 2002/0129509 A1 | 9/2002 | Evans, III |
| 2003/0000099 A1 | 1/2003 | Wang |
| 2003/0233762 A1 | 12/2003 | Blackman |
| 2004/0083615 A1 | 5/2004 | Cotner |
| 2004/0118001 A1 | 6/2004 | Turpin |
| 2004/0172839 A1 | 9/2004 | Zirk et al. |
| 2004/0205972 A2 | 10/2004 | Wu |
| 2004/0221470 A1 | 11/2004 | Lin |
| 2004/0237326 A1 | 12/2004 | Wang |
| 2005/0028397 A1 | 2/2005 | Blackman |
| 2005/0034320 A1 | 2/2005 | Conner |
| 2005/0044734 A1 * | 3/2005 | Carroll .......................... 33/42 |
| 2005/0138829 A1 | 6/2005 | Critelli |
| 2005/0210696 A1 | 9/2005 | Liao |

\* cited by examiner

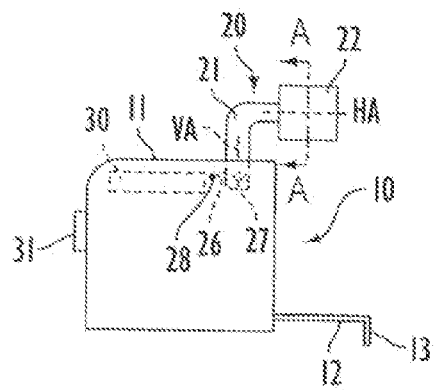
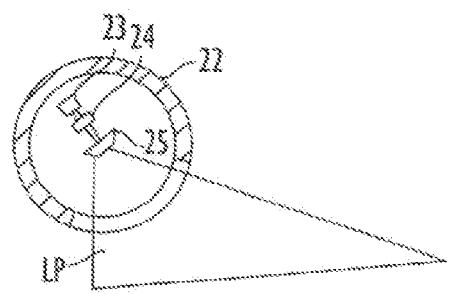
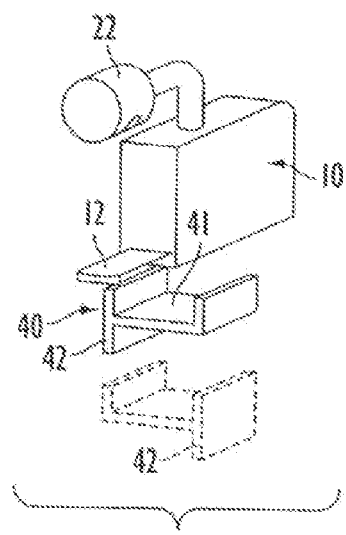
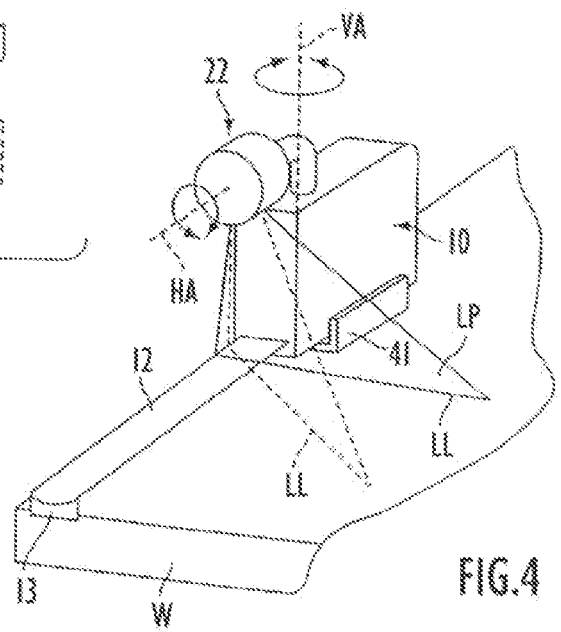
FIG.1
FIG.2
FIG.3
FIG.4

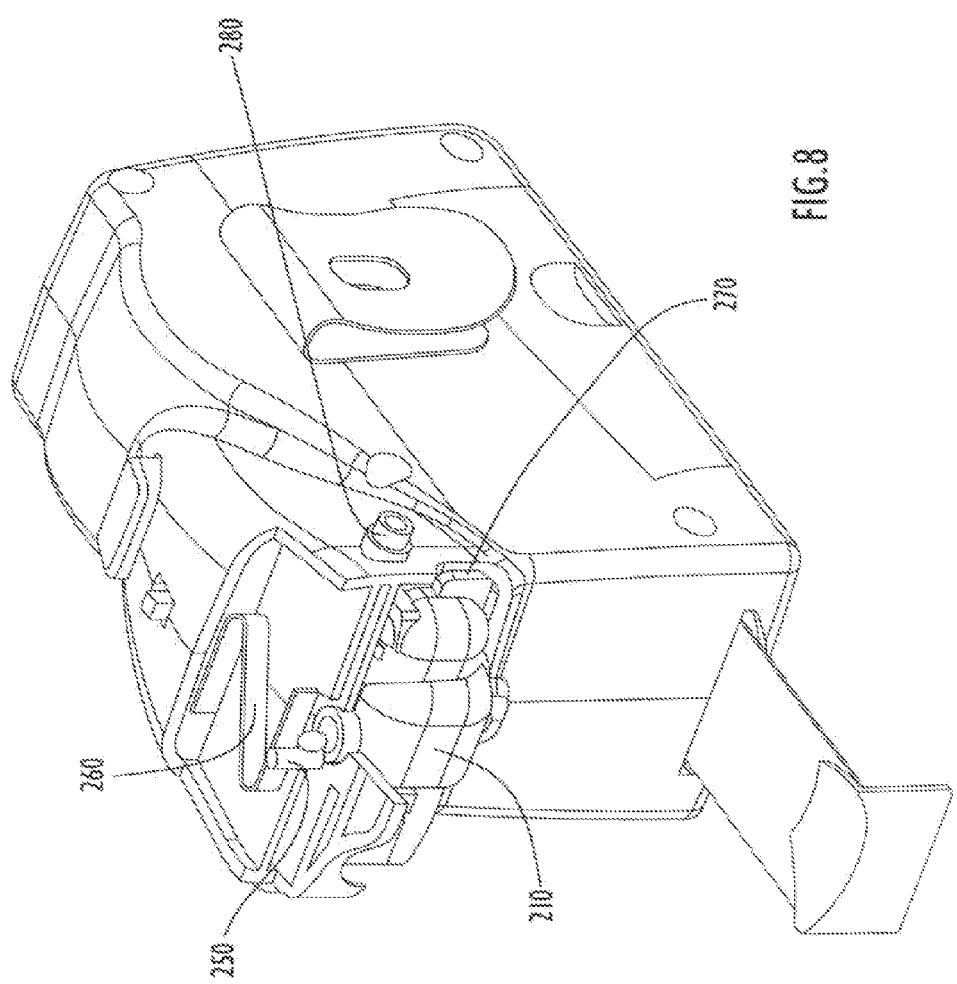

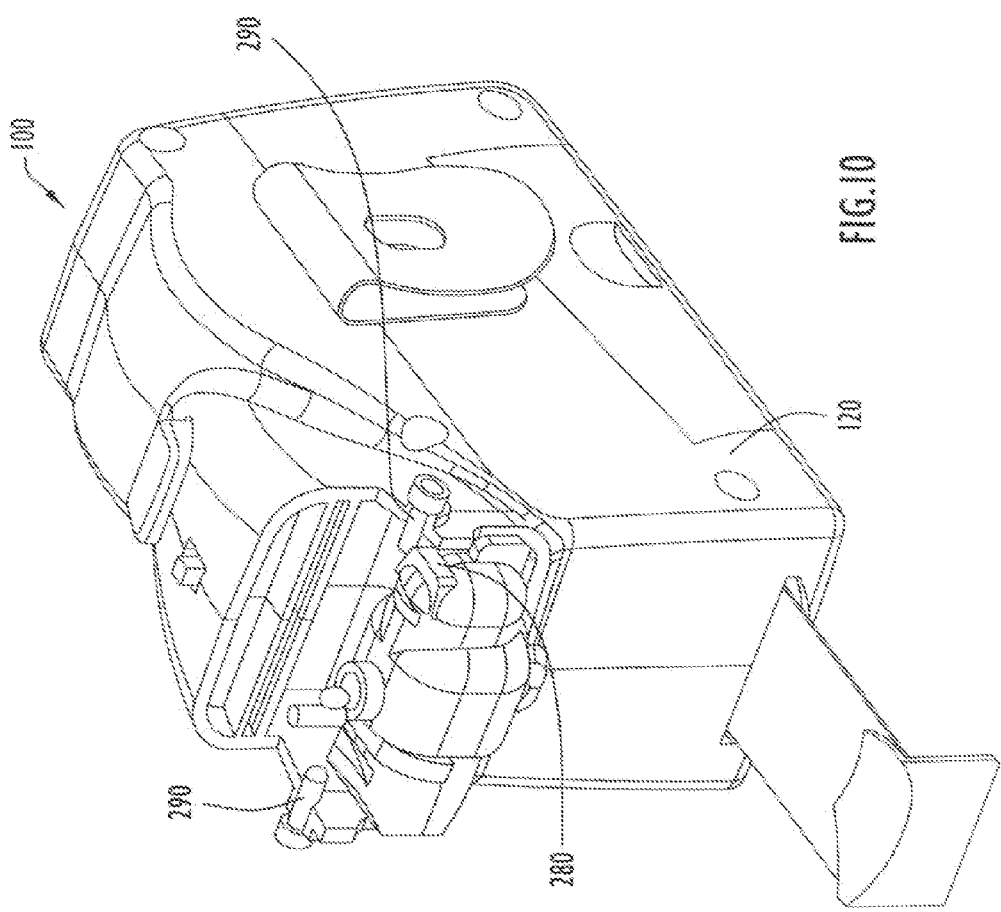

TAPE MEASURE

CROSS REFERENCE TO RELATED APPLICATION

This application is a continuation-in-part of U.S. patent application Ser. No. 10/755,435, filed 12 Jan. 2004 now U.S. Pat. No. 7,024,791 and entitled "Tape Measure with Laser Beam", the disclosure of which is hereby incorporated by reference in its entirety.

FIELD OF THE INVENTION

This invention relates generally to tape measures and more specifically to a tape measure in combination with a laser device.

BACKGROUND OF THE INVENTION

Tape measures are well known devices used to measure distances, and are helpful in marking distances. It is desired to provide a device that enables the user to measure and/or mark distances more accurately.

It is an object of the present invention to provide a laser line generator that is inexpensive and usable by the general public.

SUMMARY OF THE INVENTION

In accordance with the present invention, an improved tape measure is disclosed. The tape measure includes a housing, a rule blade coilable within the housing, and an edge guide disposed on the housing. The edge guide is repositionable with respect to the housing from a first position to a second position, and vice versa. The tape measure may further include a laser source for emitting a laser beam and a line lens in the path of the laser beam for converting the laser beam into a laser plane. Preferably, the laser plane intersects both the rule blade and a workpiece. The light plane generator may be pivoted about a horizontal axis and/or a vertical axis.

Additional features and benefits of the present invention are described, and will be apparent from, the accompanying drawings and the detailed description below.

BRIEF DESCRIPTION OF THE DRAWINGS

The accompanying drawings illustrate preferred embodiments of the invention according to the practical application of the principles thereof.

FIG. 1 illustrates a side view of a tape measure according to an embodiment of the invention.

FIG. 2 illustrates a cross-sectional view along line A-A of FIG. 1.

FIG. 3 illustrates the tape measure of FIG. 1 further including an edge guide member according to an embodiment of the invention, showing the edge guide in first and second positions.

FIG. 4 illustrates the tape measure of FIG. 3 disposed on a workpiece including an edge.

FIG. 8 illustrates the tape measure of FIGS. 6A-6C, with the front portion of the tape measure removed to show the reorientation mechanism for the laser assembly.

FIG. 10 illustrates the tape measure of FIG. 8, with the reorientation mechanism removed to show the calibration mechanism.

Like reference numerals have been used to identify like elements throughout this disclosure.

DETAILED DESCRIPTION

Figure 5A:
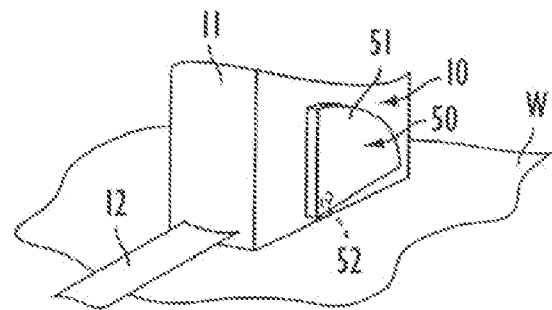
FIGS. 5A and 5B illustrate the tape measure of FIG. 1 including an edge guide according to another embodiment of the invention, showing the edge guide in a first, storage position (FIG. 5A) and a second, deployed position (FIG. 5B).

The invention is now described with reference to the accompanying figures, wherein like numerals designate like parts. Referring to FIG. 1, a tape measure 10 may have a housing 11, an elongated flexible rule blade 12 (also known as a tape) which is carried on a controllable spring-biased reel assembly (not shown) disposed within the housing 11, and a blade locking mechanism (not shown) actuated by a blade locking actuator (not shown) for locking the elongated blade 12 into a desired position to prevent the blade 12 from being further extended from the housing and from being wound into the housing by the spring-bias of the reel assembly. Persons skilled in the art will recognize that details of any of the parts referred to above, as well as further information on such tape measure, can be found in U.S. Pat. No. 6,209,219, which is incorporated by reference in its entirety.

The tape measure 10 may also include a light plane generator 20. Referring to FIGS. 1-4, the light plane generator 20 preferably generates a plane of light LP so that, when the tape measure 10 is placed on a work surface or workpiece W, the light plane LP contacts the workpiece W and/or the blade 12, creating a light line LL thereon. The light plane generator 20 may comprise a connector 21 and a laser assembly including a housing 22, a laser diode 23 disposed in the housing for generating a laser beam, a collimating lens 24 for collimating the laser beam, and a line lens 25 for converting the laser beam into a laser light plane LP. By way of example, the line lens 25 may be a cylindrical lens.

The connector 21, by way of example, may comprise an L-shaped neck. Preferably, the connector 21 pivotally connects the laser assembly to the tape measure housing 11. Accordingly, a user can adjust the light plane generator 20 about a horizontal axis HA and/or a vertical axis VA (discussed in greater detail below).

The light plane generator 20 may also include a battery 30 for powering the laser diode 23. The battery 30 may be disposed in the tape measure housing 11 or the laser assembly housing 22. The light plane generator 20 may also include a switch 31 for turning laser diode 23 on and off. The switch 31 may be disposed on the tape measure housing 11 or the laser assembly housing 22.

The laser assembly may further include a detent system for enabling a user to quickly locate the most common positions of the neck 21 (and thus light plane generator 20) relative to the tape measure housing 11. Accordingly, the neck 21 may have detent notches 27 that receive a ball 26 biased towards the neck 21 by a spring 28. Persons skilled in the art will recognize that detent notches 27 and ball 26 may also be provided on the tape measure housing 11 and neck 21, respectively.

The tape measure 10 may further comprise an edge guide. FIG. 3 is a perspective view of the tape measure of FIG. 1. The tape measure 10 may include a bracket 40 comprising a U-shaped body 41 configured to receive the tape measure 10. A flange 42 extends downward from the body 41. With such arrangement, the user can place the flange 42 against an edge of a workpiece W, thus mounting tape measure 10 at the periphery of the workpiece W. As illustrated, the bracket 40 may be selectively disposed on the tape measure 10 in two positions. In the first position, the flange 42 is oriented toward the left side of the housing 11 (from the viewpoint of FIG. 3 (shown in solid lines)). In the second position, the flange 42 is oriented toward the right side of the housing 11 (shown as broken lines in FIG. 3). The bracket 40 is removable, and can be easily repositioned on the housing 11.

With this configuration, the tape measure 10 may be coupled to the bracket 40 and then placed on a workpiece W, engaging the edge of the workpiece with the bracket. The blade 12 is then extended, and the tab 13 is hooked to another edge of the workpiece W. The light plane generator 20 is then activated by engaging the switch 31. The light plane generator 20 then generates a light plane LP, which creates a light line LL on the workpiece W. The user can rotate the laser assembly housing 22 about the horizontal axis HA so that the light plane LP also lights the blade 12. Accordingly, light line LL will show on both the blade 12 and the workpiece W. If desired, the user can rotate light plane generator 20 about vertical axis VA to change the angle of light line LL relative to blade 12, as shown in broken lines in FIG. 4.

Figure 9A:
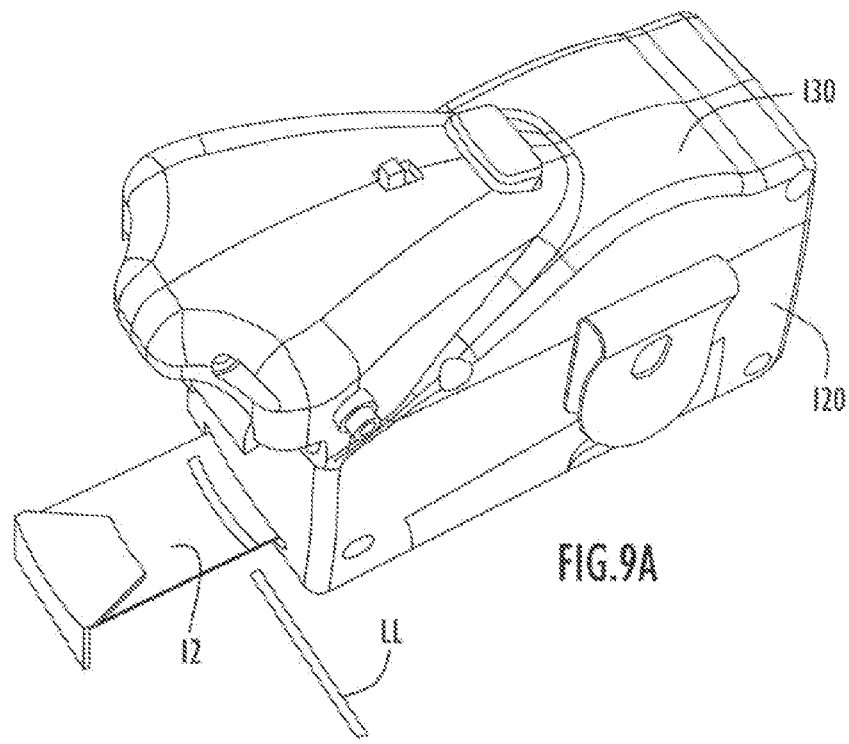
FIGS. 9A and 9B illustrate perspective top views of the tape measure of FIGS. 6A-6C, showing alignment of a laser line along edges of the tape blade.
Figure 9B:
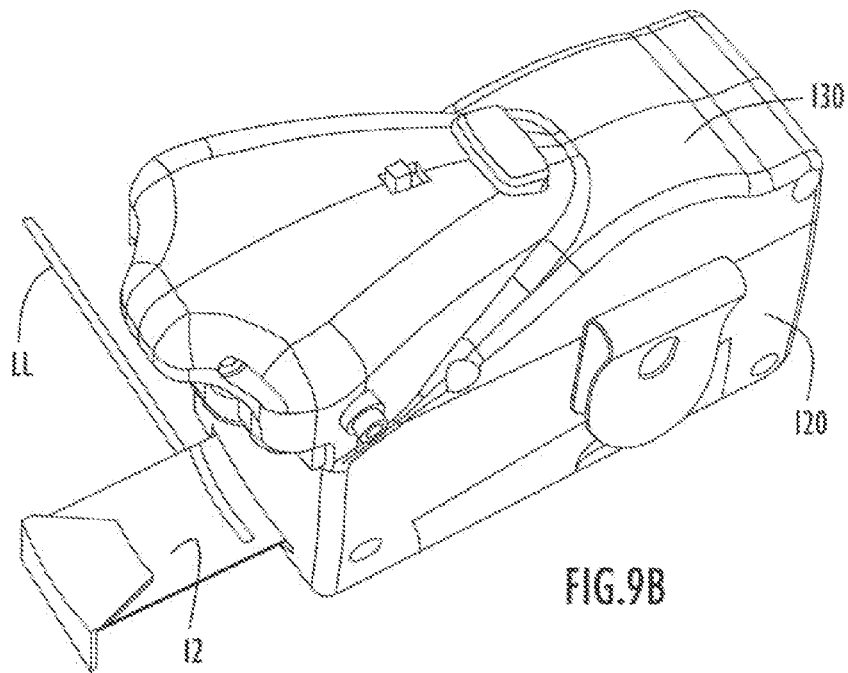

Persons skilled in the art will recognize that, in the embodiment shown in FIG. 4, the light line LL extends rightward from blade 12. However, the user need only rotate housing 22 about the horizontal axis HA in order for light line LL to extend leftward from blade 12 (FIGS. 9A and 9B).

Figure 5B:
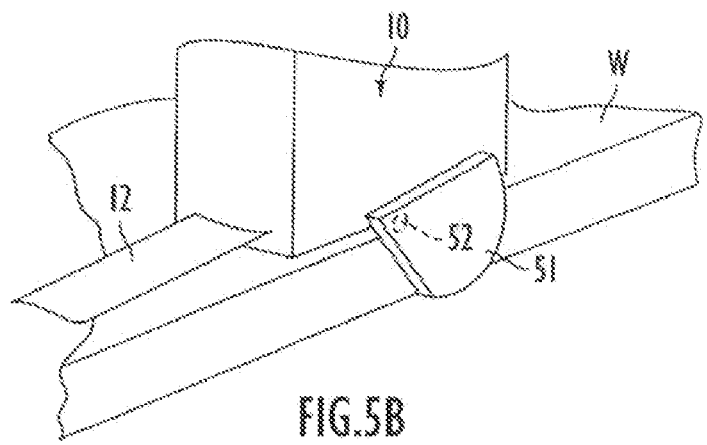

Persons skilled in the art will recognize that other edge guides may be used with tape measure 10. FIGS. 5A and 5B show an edge guide according to another embodiment of the invention. As illustrated, a pivoting bracket 50 may be disposed on the tape measure 10. The pivoting bracket 50 may include a flange 51 which is pivotably coupled to the housing 11 via a shaft 52. With this configuration, the flange 51 may be rotated between a first position where the flange 51 does not contact the edge of the workpiece W (shown in FIG. 5A) and a second position where the flange 51 contacts the edge of the workpiece W (shown in FIG. 5B).

Figure 5C:
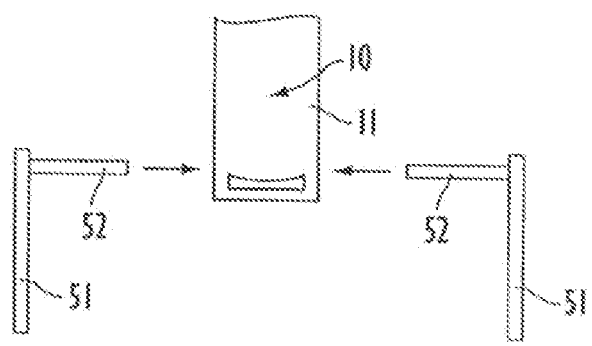
FIG. 5C illustrates different installation alternatives for the edge guides of FIGS. 5A and 5B.

Referring to FIG. 5C, the pivoting bracket 50 may also be configured to separate from the housing 11 and insert into the other side thereof. Specifically, each side of the housing 11 may include a slot that receives a portion (e.g., the shaft 52) of the bracket 50. With this configuration, the bracket 50 can be moved from a first position to a second position to selectively contact different edges of the workpiece W. Alternatively, the housing 11 may carry two pivoting brackets 50 non-removably and rotatably attached to housing 11.

Figure 6A:
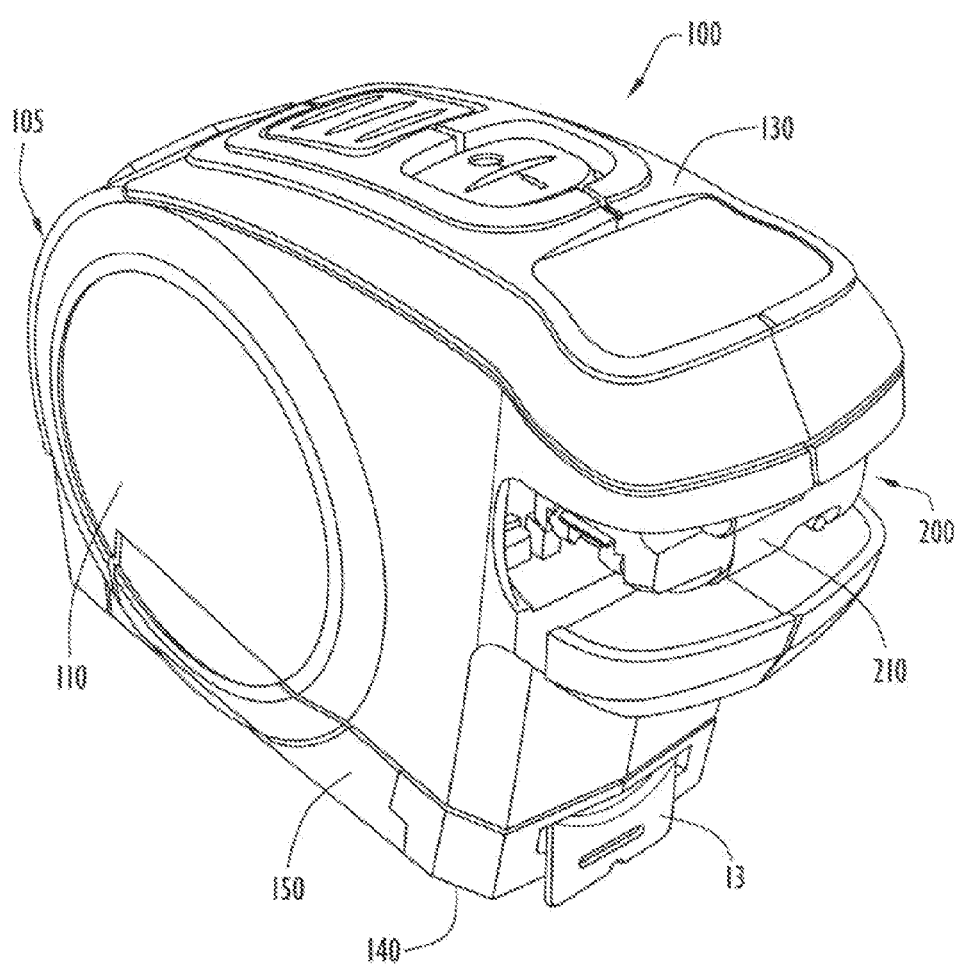
FIGS. 6A-6C illustrates a perspective view of a tape measure including an edge guide according to another embodiment of the invention, showing the edge guide in a first, storage position.
Figure 6B:
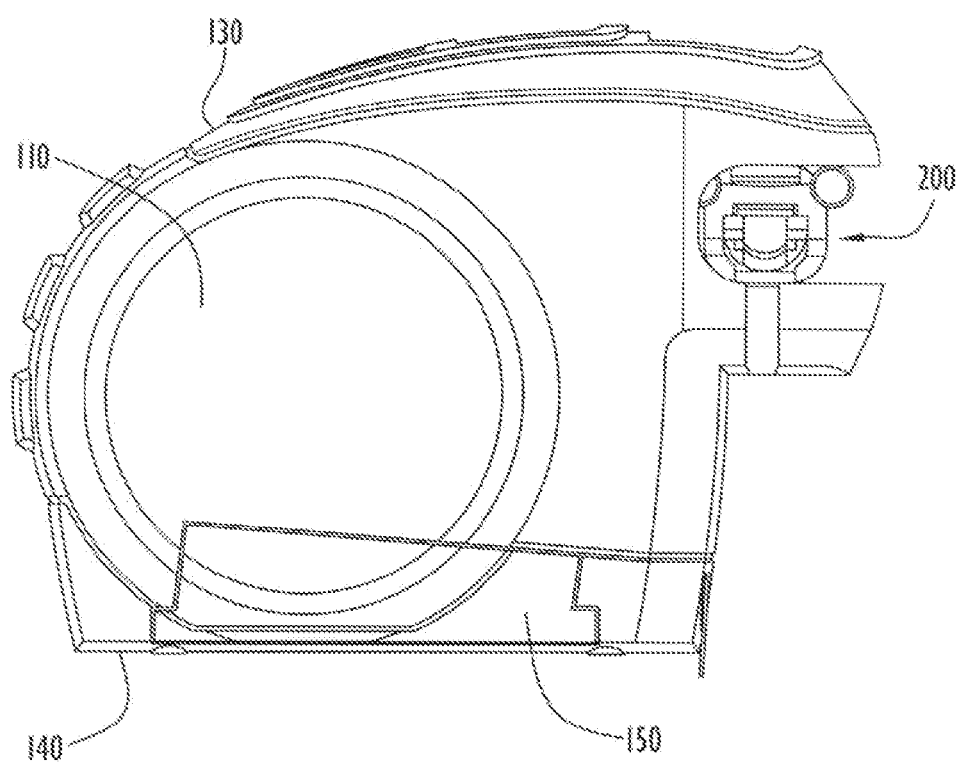
Figure 6C:
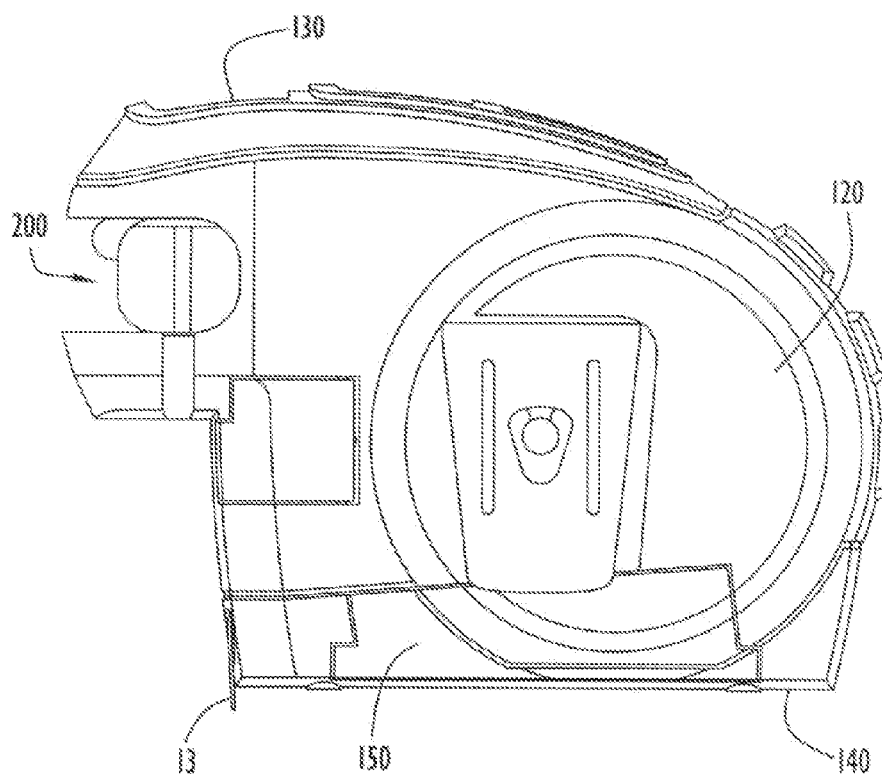
Figure 7:
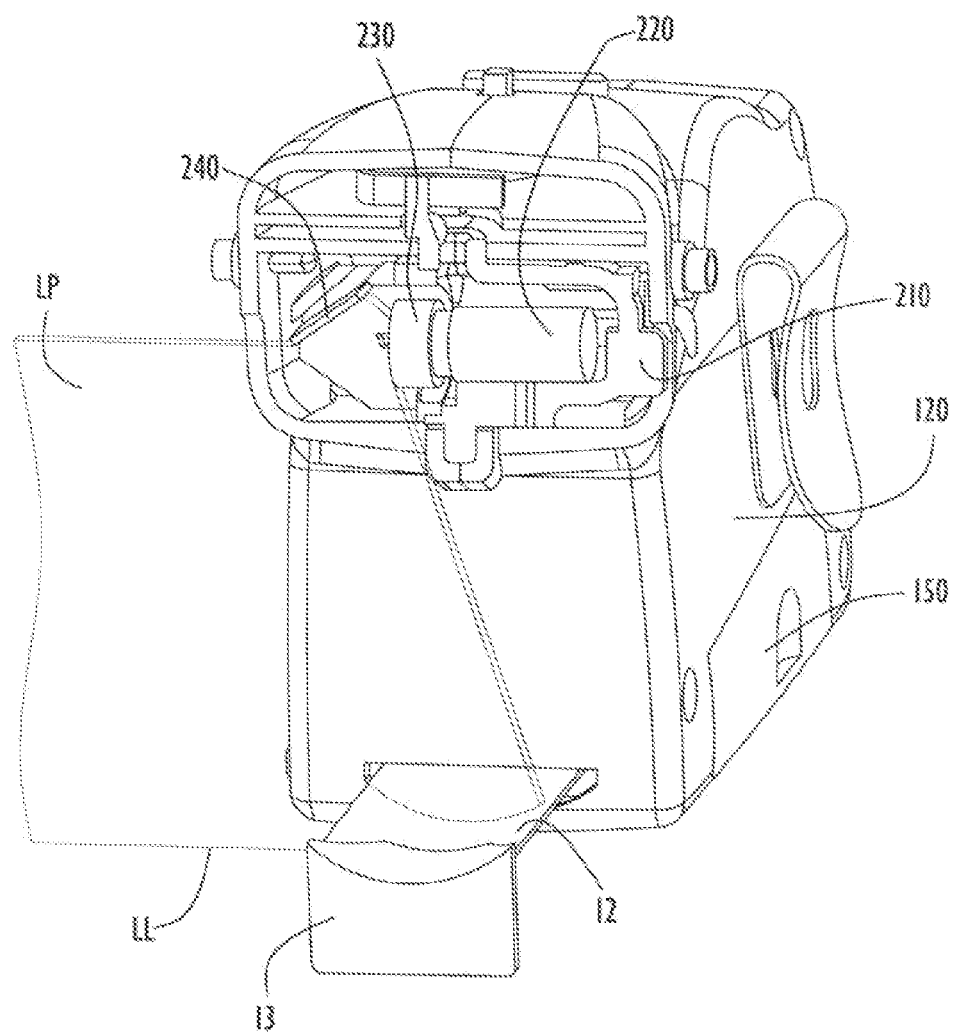
FIG. 7 illustrates the tape measure of FIGS. 6A-6C, with the front portion of the tape measure removed to show the laser assembly.

FIGS. 6A-6C illustrate a tape measure according to another embodiment of the invention. The tape measure 100 is generally similar to that disclosed above and includes a housing 105 having a first side wall 110, a second side wall 120, an upper wall or top 130, and a lower wall or bottom 140. The tape measure 100 further includes the light plane generator 200 similar to that discussed above. FIG. 7 illustrates the tape measure of FIGS. 6A-6C with the top portion of the tape measure housing 105 removed. As with the above embodiment, the light plane generator 200 comprises a laser assembly including a laser housing 210 that contains a laser barrel 220 (which contains the laser diode and a collimating lens (FIG. 2)), a line generating lens 230, and a mirror 240. The laser barrel 220 produces a narrow beam of laser light, and the line lens diffracts the light into a plane. The plane of light creates a visible line on the work surface W. In addition, the mirror 240 also reflects a portion of the laser plane LP toward the tape blade 12 to create a visible light line LL on the tape blade.

The light plane generator 200 may also be configured to permit the rotation of the laser assembly (i.e., the laser housing 210) with respect to the tape measure housing 105. FIG. 8 is a perspective view of the tape measure of FIGS. 6A-6C, showing a reorientation mechanism used to pivot the laser assembly and direct the laser plane beyond any edge of the tape blade 12. As illustrated, a post 250 extends from the laser housing 210. The post may pivot about a generally vertical axis to reorient the laser plane LP with respect to the tape blade 12 and/or work surface W. A spring 260 may be disposed within the housing 210 and configured to press against the post 250. The post 250, furthermore, may be off-center from its axis of rotation so that the spring 260 pushes the post in a position that directs the light plane LP toward either the first side 110 or the second side 120 of the tape measure housing 105 (e.g., the left-facing or right-facing positions). A finger tab 270 on the end of the laser assembly housing 210 assists a user in rotating the housing 210 from a first side position to the second side position and vice versa. In operation, the laser assembly housing begins in a first position. A user rotates the laser assembly housing 210 to over come the bias of the spring 260. The rotation continues about the vertical axis VA (FIG. 4) until the spring bias on the post 250 urges the laser assembly housing 210 into a second position. With this configuration, laser assembly housing 210 is adapted to pivot 180 degrees with respect to the tape measure housing 105 to move the laser line from one side of the tape measure 100 to the other side of the tape measure, as illustrated in FIGS. 9A and 9B.

FIG. 10 is a perspective view of the tape measure of FIG. 8, with the reorientation mechanism removed for clarity. The orientation of the laser line may be further adjusted via calibration mechanism. As illustrated, the laser assembly housing 210 includes ramps 280 with angled surfaces. Specifically, one ramp 280 faces the first side wall 110 of the tape measure housing 105 and one ramp faces the second side wall 120 of the tape measure housing 105. Corresponding calibration screws 290 are aligned to contact its respective ramp 280. Adjusting a screw 290 causes the laser assembly to rotate slightly more or slightly less about its axis. This enables a user to adjust the orientation of the laser line to align the laser line with markings on the tape blade 12 and/or orient the light line perpendicular to the blade 12 and/or work surface edge.

Figure 11:
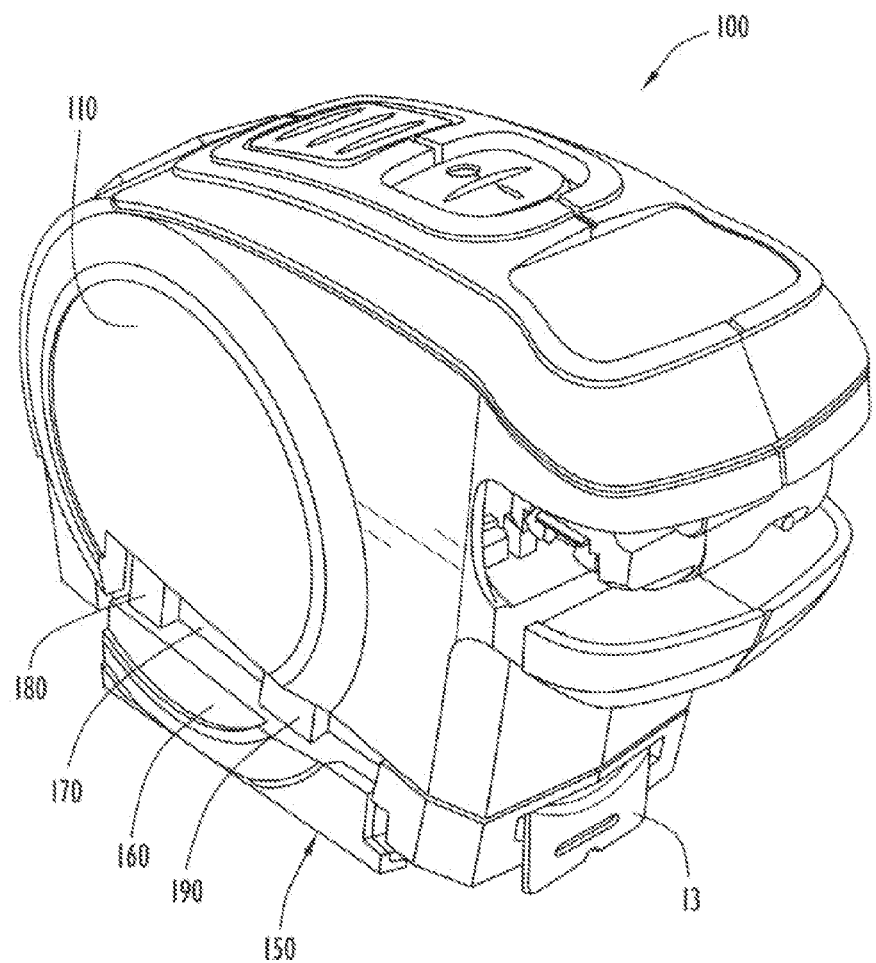
FIG. 11 illustrates the tape measure of FIGS. 6A-6C, showing the edge guide in a second, deployed position.

Referring back to FIGS. 6A-6C, the tape measure 100 further includes an edge guide comprising an extensible portion or member 150 adapted to move from a first, storage position, in which the extensible member 150 is retracted into the housing, to a second, deployed position, in which the extensible member 150 is extended from the housing. In the stored position, the extensible member 150 is generally flush with the bottom 140 of the housing 105. Referring to FIG. 11, in the deployed orientation, the extensible member 150 extends downward, beyond the housing bottom 140 such that it the member is capable of contacting the edge of the work surface. With this configuration, a user may selectively engage either extensible member 150, enabling a user to align the tape measure 100 on the edge of the work surface W. This, in turn, assists a user in properly orienting the blade 12 parallel to the edge of the work surface so that the laser line LL is perpendicular to the blade 12 and/or work surface edge.

The configuration of the extensible member is not particularly limited. In the embodiment illustrated in FIG. 10, the extensible member includes a panel 160 configured to move into and out of a recess 170 disposed along the first and second walls 110, 120 of the housing 105. The panel 160 may be configured to move along a pair of guide rails 180, 190. Specifically, the panel 160 may comprise slots into which the rails 180, 190 axially insert when the panel 160 is urged upward (into the recess) and placed in its stored position. In operation, the extensible member 150 is moved from its first position to its second position by sliding the panel 160 along the rails. Alternatively, the rails 180, 190 may be fixed to the panel 160, and the side walls of the housing 110, 120 may include slots (not shown) that receive the rails 180, 190. In operation, the rails 180, 190 are axially inserted into or removed from the housing slots to move the edge guide from the first position to the second position, and vice versa.

While the invention has been described in detail and with reference to specific embodiments thereof, it will be apparent to one skilled in the art that various changes and modifications can be made therein without departing from the spirit and scope thereof. For example, the housing 11, 100 may include any shape and size suitable for its described purpose. The number of edge guides disposed on the housing is not particularly limited. In addition, the edge guides may be adapted to orient in any number of positions. The edge guides may include a detent mechanism to control the degree of rotation or extension. While the slot configuration is illustrated with regard to the pivoting bracket 50, it may further be implemented with a non-pivoting bracket. The tape measure housing may further include bosses protruding from the exterior surface of the housing and, in particular two aligned bosses extending from the first side wall 110 and two aligned bosses extending from the second side wall 120. The bosses space the tape measure from a surface. In operation, the bosses can be used to align the tape measure 10, 100 parallel to a vertical surface. Thus, it is intended that the present invention covers the modifications and variations of this invention provided they come within the scope of the appended claims and their equivalents.

We claim:

1. A measuring device disposable on a work surface including an edge, the measuring device comprising:
   a housing including a top side, a bottom side, a first side and a second side;
   a rule blade adapted to extend from the housing, wherein:
      the rule blade is disposed between the first and second sides, and
      the rule blade extends along a plane parallel to the top and bottom sides; and
   an edge guide operable to selectively contact the edge of the work surface, wherein:
      the edge guide comprises a bracket pivotally coupled to either the first housing side or the second housing side, and
      the edge guide is repositionable with respect to the housing from a first, storage position to a second, deployed position and vice versa.

2. The measuring device of claim 1, wherein the bracket is configured to selectively rotate from the first, storage position, in which the bracket does not contact the edge of the work surface, to the second, deployed position, in which the bracket contacts the edge of the work surface.

3. The measuring device of claim 1, wherein the bracket comprises a first flange coupled to the housing via a shaft.

4. The measuring device of claim 1, wherein the bracket comprises a first flange pivotally coupled to the first housing side and a second flange pivotally coupled to the second housing side.

5. The measuring device of claim 4, wherein each of the first and second flanges is configured to selectively rotate from the first, storage position, in which the flange does not contact the edge of the work surface, to the second, deployed position, in which the flange contacts the edge of the work surface.

6. A measuring device disposable on a work surface including an edge, the measuring device comprising:
   a housing including a top side, a bottom side, a first side and a second side, wherein the first housing side and the second housing side each includes a slot; and
   a rule blade disposed between the first and second sides, the rule blade operable to extend from the housing along a plane generally parallel to the top and bottom sides; and
   an edge guide adapted to contact the edge of the work surface, wherein:
      the edge guide is repositionable with respect to the housing from a first, storage position to a second, deployed position and vice versa, and
      the edge guide comprises a bracket having:
         a generally vertical portion including a first surface and a second surface; and
         a generally horizontal portion extending from the first surface of the vertical portion,
   wherein the generally horizontal portion is configured to releasably mate with each of the slots formed in the first housing side and the second housing side.

7. The measuring device of claim 6, wherein:
   in the first, storage position the bracket does not contact the edge of the work surface, and
   in the second, deployed position the bracket contacts the edge of the work surface.

8. A measuring device disposable on a work surface including an edge, the measuring device comprising:
   a housing including a top side, a bottom side, a first side, and a second side;
   a rule blade operable to extend from the housing, wherein:
      the rule blade is disposed between the first and second sides, and
      the rule blade extends along a plane generally parallel to the top and bottom sides; and
   an edge guide operable to contact the edge of the work surface,
   wherein the edge guide comprises an extensible portion formed into the first housing side or the second housing side, the extensible portion repositionable from a first, storage position, in which the extensible portion does not contact the edge of the work surface, to a second, deployed position, in which the extensible portion contacts the edge of the work surface.

9. The measuring device of claim 8, wherein the extensible portion extends in a direction generally perpendicular to the rule blade.

10. The measuring device of claim 8, wherein:
in the storage configuration, the extensible member is generally flush with the bottom housing side; and
in the deployed configuration, the extensible member extends beyond the bottom housing side.

11. The measuring device of claim 8, wherein the extensible member comprises a panel configured to slide along one or more rails.

12. A method of orienting a measuring device on a work surface including a work surface edge, the method comprising:
(a) disposing a measuring device on a work surface, the measuring device comprising:
a housing including a top side, a bottom side, a first side and a second side,
a rule blade adapted to extend from the housing, wherein:
the rule blade is disposed between the first and second sides, and
the rule blade extends along a plane generally parallel to the top and bottom sides, and
an edge guide adapted to contact the edge of the work surface comprising a first portion pivotally coupled to either the first housing side or the second housing side, wherein the edge guide is repositionable with respect to the housing from a first, storage position to a second, deployed position and vice versa; and
(b) rotating the first portion from a first, storage position, in which the portion is configured to not contact the edge of the work surface, to a second, deployed position, in which the portion is configured to contact the edge of the work surface.

13. The method of claim 12, wherein:
the first portion is pivotally coupled to the first housing side;
the edge guide further comprises a second portion pivotally coupled to the second housing side; and
(b) further comprises (b.1) selectively rotating at least one of the first portion and the second portion from a first, storage position, in which the selected portion is configured to not contact the edge of the work surface, to a second, deployed position, in which the selected portion is configured to contact the edge of the work surface.

14. A method of orienting a measuring device on a work surface including a work surface edge, the method comprising:
(a) disposing a measuring device on a work surface, the measuring device comprising:
a housing including a top side, a bottom side, a first side and a second side,
a rule blade adapted to extend from the housing, wherein:
the rule blade is disposed between the first and second sides, and
the rule blade extends along a plane generally parallel to the top and bottom sides, and
an edge guide comprising an extensible portion configured to extend along an axis perpendicular to the rule blade the extensible portion repositionable from a first, storage position to a second, deployed position; and
(b) moving the extensible portion from the first storage position, in which the portion is configured to not contact the edge of the work surface, to the second, deployed position, in which the extensible portion is configured to contact the edge of the work surface.

15. The method of claim 14, wherein:
in the first, storage position, the extensible portion is generally flush with the bottom side, and
in the second, deployed position, the extensible portion extends beyond the bottom side.

16. The method of claim 14, wherein the extensible portion comprises a panel slidingly coupled to at least one rail and (b) comprises (b.1) sliding the extensible portion from the first, storage position, to the second, deployed position.

17. A method of aligning a measuring device comprising:
(a) providing a tape measure including:
a housing;
a rule blade adapted to extend from the housing, the rule blade including
a blade surface extending between a first blade edge and a second blade edge, and
indicia on the blade surface, the indicia configured for making a measurement;
an edge guide adapted to contact the edge of the work surface, wherein the edge guide is repositionable with respect to the housing from a first edge guide position to a second edge guide position and vice versa, and
a light generator operable to emit a light plane extending from a point located on the blade surface to a point located beyond at least one of the first blade edge and the second blade edge;
(b) disposing the measuring device on a work surface including an edge;
(c) orienting the edge guide to contact the work surface edge and position the rule blade generally parallel with the work surface edge;
(d) activating the light generator to emit the light plane such that the light plane is oriented generally perpendicular to each of the rule blade and the work surface edge; and (e) directing the light plane to align the indicia on the blade surface with the point located beyond at least one of the first blade edge and the second blade edge.

18. The method of claim 17, wherein measuring device further includes a calibration mechanism and the method further comprises step (e) calibrating the light plane to reorient the plane with respect to the rule blade and the work surface edge.

19. The method of claim 18, wherein the calibration mechanism includes a ramp with an angled surface and a screw that engages the ramp, and step (e) comprises (e.1) adjusting the screw to reorient the plane with respect to the rule blade and the work surface.

20. A measuring device comprising:
a housing;
a rule blade adapted to extend from the housing, the rule blade including:
a blade surface extending between a first blade edge and a second blade edge, and
indicia on the blade surface configured for making a measurement;
a laser assembly operable to emit a light plane extending from a point located on the blade surface to a point located beyond the first blade edge or the second blade edge; and
a reorientation mechanism operable to pivot the laser assembly from a first laser assembly position, in which the light plane extends from the point on the blade surface to the point beyond the first blade edge, to a second laser assembly position, in which the light plane extends from the point on the blade surface to the point beyond the second blade edge, wherein the light plane is configured to align the indicia on the blade surface with the point located beyond the first blade edge or the second blade edge.

21. The measuring device of claim 20, wherein the laser assembly comprises:

a laser barrel configured to generate a beam of laser light;

a line generating lens adapted to diffract the beam of laser light into the light plane; and a mirror configured to reflect a portion of the laser plane toward the rule blade.

22. The measuring device of claim 20, wherein the reorientation mechanism comprises a post extending from the laser assembly and a spring configured to engage the post and bias the laser assembly in either the first laser assembly position or the second laser assembly position.

23. The measuring device of claim 20 further comprising a calibration mechanism to operable to align of the light plane with respect to the rule blade.

24. The measuring device of claim 23, wherein the calibration mechanism comprises an adjustable portion configured to selectively engage the laser assembly and permit the partial rotation of the laser assembly about its axis.

\* \* \* \* \*